(12) United States Patent
Numao

(10) Patent No.: US 8,123,889 B2
(45) Date of Patent: Feb. 28, 2012

(54) ADHESION METHOD AND ADHESION APPARATUS OF SEPARATORS, AND SEPARATOR ADHESION BODY

(75) Inventor: Yasuhiro Numao, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1088 days.

(21) Appl. No.: 11/667,859

(22) PCT Filed: Nov. 14, 2005

(86) PCT No.: PCT/JP2005/020792
§ 371 (c)(1),
(2), (4) Date: May 16, 2007

(87) PCT Pub. No.: WO2006/054499
PCT Pub. Date: May 26, 2006

(65) Prior Publication Data
US 2008/0008923 A1   Jan. 10, 2008

(30) Foreign Application Priority Data
Nov. 17, 2004 (JP) .................. 2004-333389

(51) Int. Cl.
  B29C 65/52 (2006.01)
  B29C 65/60 (2006.01)
  H01M 8/00 (2006.01)

(52) U.S. Cl. ........ 156/182; 156/558; 156/563; 156/578; 429/452

(58) Field of Classification Search .......... 156/356, 156/357, 558, 563, 578, 182; 414/788.1, 414/791.6, 792.7, 792.8, 792.9; 429/457, 452
See application file for complete search history.

(56) References Cited

U.S. PATENT DOCUMENTS

| | | | | |
|---|---|---|---|---|
| 5,040,484 A | * | 8/1991 | Mears et al. | 118/503 |
| 5,783,026 A | * | 7/1998 | Natarajan et al. | 156/378 |
| 2002/0031698 A1 | | 3/2002 | Inoue et al. | |
| 2002/0110720 A1 | * | 8/2002 | Yang | 429/35 |
| 2003/0145942 A1 | | 8/2003 | Andrews et al. | |
| 2004/0168306 A1 | * | 9/2004 | Kamiyama et al. | 29/623.3 |
| 2005/0061426 A1 | * | 3/2005 | Parker et al. | 156/264 |

FOREIGN PATENT DOCUMENTS

| | | |
|---|---|---|
| CA | 2436901 A1 | 2/2004 |
| DE | 10251775 A1 | 5/2004 |
| JP | 2001-319666 A | 11/2001 |
| JP | 2001-332277 A | 11/2001 |
| JP | 2002-246042 A | 8/2002 |
| JP | 2003-022827 A | 1/2003 |
| JP | 2004-006419 A | 1/2004 |
| JP | 2005-123063 A | 5/2005 |
| JP | 2005-166425 A | 6/2005 |

* cited by examiner

Primary Examiner — Katarzyna Wyrozebski Lee
Assistant Examiner — Scott W Dodds
(74) Attorney, Agent, or Firm — Foley & Lardner LLP

(57) ABSTRACT

A second separator (2) that becomes an opposite electrode to a first separator (1) is stacked on a surface of the first separator (1), on which an adhesive (3) is coated, and a separator unit (4) as a set is formed. Then, at least two or more of the separator units (4) are stacked on one another, and the adhesive (3) is cured.

8 Claims, 8 Drawing Sheets

ADHESION METHOD AND ADHESION APPARATUS OF SEPARATORS, AND SEPARATOR ADHESION BODY

TECHNICAL FIELD

The present invention relates to an adhesion method and adhesion apparatus of separators, and a separator adhesion body.

BACKGROUND ART

A fuel cell is of a system that generates electric power in a mode of extracting electromotive force based on an electrochemical reaction of fuel (example: gaseous hydrogen) and an oxidizer (example: air) to an outside of a reaction mechanism. The fuel cell does not generate a harmful emission, and contributes to the environmental conservation.

A cell in which a power generation mechanism of the fuel cell system is formed into a single configuration is referred to as a "single cell". A multiple cell in which a plurality of the single cells are stacked on one another and are electrically interconnected is referred to as a "fuel cell stack" or simply as a "stack".

In the case of a polymer electrolyte fuel cell, each of the single cells which compose the fuel cell stack has a substantially plate-like structure in which an electrode layer and a gas diffusion layer are arranged on positive and negative electrodes of a solid polymer electrolyte membrane, respectively. Each single cell is physically separated from the single cell adjacent thereto by a sheet-like positive electrode or negative electrode separator (hereinafter, often generically referred to as a "fuel cell separator" or simply as a "separator") attached onto an outside of the electrode layer or the gas diffusion layer.

Such single-cell power generation mechanisms adjacent to each other are separated from each other by a set of the positive electrode and negative electrode separators adjacent to each other. Hence, the set of separators is also called the "separator". Hereinafter, according to needs, the set of separators will be referred to as a "separator unit" or a "separator adhesion body", and will be distinguished from the positive electrode or negative electrode separators.

The fuel, the oxidizer, and a cooling medium (example: a coolant) are included in utilities of the single-cell power generation mechanism. Each of the separators defines passages (that is, a fuel passage, an oxidizer passage, and a cooling medium passage) which supply the utilities to or circulate the utilities through the power generation mechanisms related to the separator concerned.

These passages are defined by surface regions (example: an uneven surface, a groove surface, a through-holed inner wall surface) of the separator, which are related to the passages concerned. Hence, these surface regions are subjected to processing treatments corresponding thereto.

Each separator of the fuel cell is molded by using a die that follows passage patterns corresponding to the separator concerned. For example, the separator is molded by a method of compressing a mixture of carbon and thermosetting resin. There is a cutting method of performing cutting processing (for example, groove cutting) for a blank material (a flat plate on which grooves are not cut) of the separator. The cutting method has advantages that dimensional accuracy in the cutting processing is good and that a deflection of the separator is small; however, the above-described molding method is mainly used in terms of production efficiency.

The fuel cell stack requires a sealing material that seals the utilities. A compression gasket or an adhesive is usually used as the sealing material.

In the case of using the adhesive as the sealing material, the adhesive is coated on individual separators, and the plurality of separators on which the adhesive is coated are stacked on one another, and then the adhesive is cured to adhere and join these separators to one another.

Development of an adhesion method and adhesion apparatus of the separators by using the adhesive has been being progressed.

Japanese Patent Laid-Open Publication No. 2004-6419 discloses a technology for coating the adhesive with a uniform thickness on the separators, and equalizing surface pressures applied to stacked surfaces of such stacked members that compose the fuel cell stack, thereby reducing an internal resistance of the fuel cell, and preventing a mixing or leakage of the fuel.

Japanese Patent Laid-Open Publication No. 2003-22827 discloses a technology for correcting the deflection of the separators by using a negative pressure.

DISCLOSURE OF THE INVENTION

However, in the technology according to Japanese Patent Laid-Open Publication No. 2004-6419, it is difficult to ensure thickness accuracy of the separators. In the fuel cell stack, even if the respective separators are set within a dimensional tolerance, a thickness of the stacked separators when several ten to several hundred pieces thereof are stacked on one another does not always meet design specifications. Moreover, if the thickness of the individual separators is increased, then it becomes difficult to fix the separators by a stacking mechanism, also resulting in that the number of stacked separators is decreased.

The technology according to Japanese Patent Laid-Open Publication No. 2003-22827 corrects the deflection of the separators by a correction apparatus when membrane electrode joined bodies are stacked on one another. In this event, the adhesive is coated for each of the separators, the separators are then stacked on one another, and it takes a time to do work for the coating and the stacking. Moreover, in the event of adhering the molded separators on one another, the adhesive is coated on the separators accompanied with the deflection based on the molding. The adhesive is cured at a low temperature in order to suppress a residual stress caused when the adhesive is cured, and it takes a longer time to do work for such low-temperature curing. It takes several ten hours to cure the adhesive depending on a type of the adhesive, which has governed a manufacturing time of the fuel cell stack. In addition, in order to adhere such deflection separators on one another, it is necessary, after coating the adhesive, to prevent the deflection of the separators one more time in a state where one of the separators is stacked on the other (a partner separator), and the coating of the adhesive and the holding of the separators have been repeated every time.

The present invention has been made in order to solve problems as described above.

It is an object of the present invention to provide an adhesion method of separators, which is capable of adhering a plurality of the separators on one another efficiently in a short time, to provide an adhesion method of the separators, which is capable of shortening a manufacturing time, continuously adhering the separators on one another while correcting a deflection thereof, and obtaining a highly reliable fuel cell, to provide an adhesion apparatus of the separators, which is capable of reducing the deflection, and adhering the separators on one another with high dimensional accuracy, and to provide an adhesion body of the separators with a less deflection and high dimensional accuracy.

In order to achieve the above-described object, an adhesion method of separators according to one aspect of the present invention includes the steps of: stacking a second separator that becomes an opposite separator to a first separator on a surface of the first separator, on which an adhesive is coated, thereby obtaining a separator unit as a set; and stacking two or more of the separator units on one another, and curing the adhesive.

An adhesion method of separators according to another aspect of the present invention is a method, wherein there is used an adhesion apparatus of the separators, which includes a stage that mounts a separator thereon, an adhesive coating portion that coats an adhesive on the separator, a vertically and crosswise movable fixing portion that fixes the separator to the stage, and a conveyor portion that conveys the separator onto the stage, and after conveying a first separator onto the stage and fixing the first separator thereto, the adhesive is coated on the first separator, a second separator and a third separator are conveyed onto the stage by using the conveyor portion, the stage or the fixing portion is moved, and the adhesive is cured.

An adhesion apparatus of separators according to another aspect of the present invention includes: a stage that mounts a separator thereon; an adhesive coating portion that coats an adhesive on the separator; a vertically and crosswise movable fixing portion that fixes the separator to the stage; and a conveyor portion that conveys the separator onto the stage.

An adhesion apparatus of separators according to another aspect of the present invention includes: a handling portion for handling a separator unit in which a second separator that becomes an opposite separator to a first separator is stacked on a surface of the first separator, on which an adhesive is coated; a control portion that stacks two or more of the separator units on the handling portion; and an adhesive curing portion that cures the adhesive of the stacked separator units.

In accordance with another aspect of the present invention, there is provided a separator adhesion body, wherein a second separator that becomes an opposite separator to a first separator is stacked on a surface of the first separator, on which an adhesive is coated, and a separator unit is made as a set, and two or more of the separator units are stacked on one another, and the adhesive is cured.

Other objects, features and functions of the present invention, which are than the above-described ones, will be made obvious by reading a best mode for carrying out the invention, which will be described below with reference to the accompanying drawings.

BEST MODE FOR CARRYING OUT THE INVENTION

Next, a description will be made of an adhesion method and adhesion apparatus of separators according to embodiments of the present invention with reference to the drawings.

First Embodiment

First, a description will be made of an adhesion method of separators according to a first embodiment of the present invention, and an adhesion apparatus of the separators, which executes the adhesion method, with reference to FIG. 1 to FIG. 8.

Figure 1:
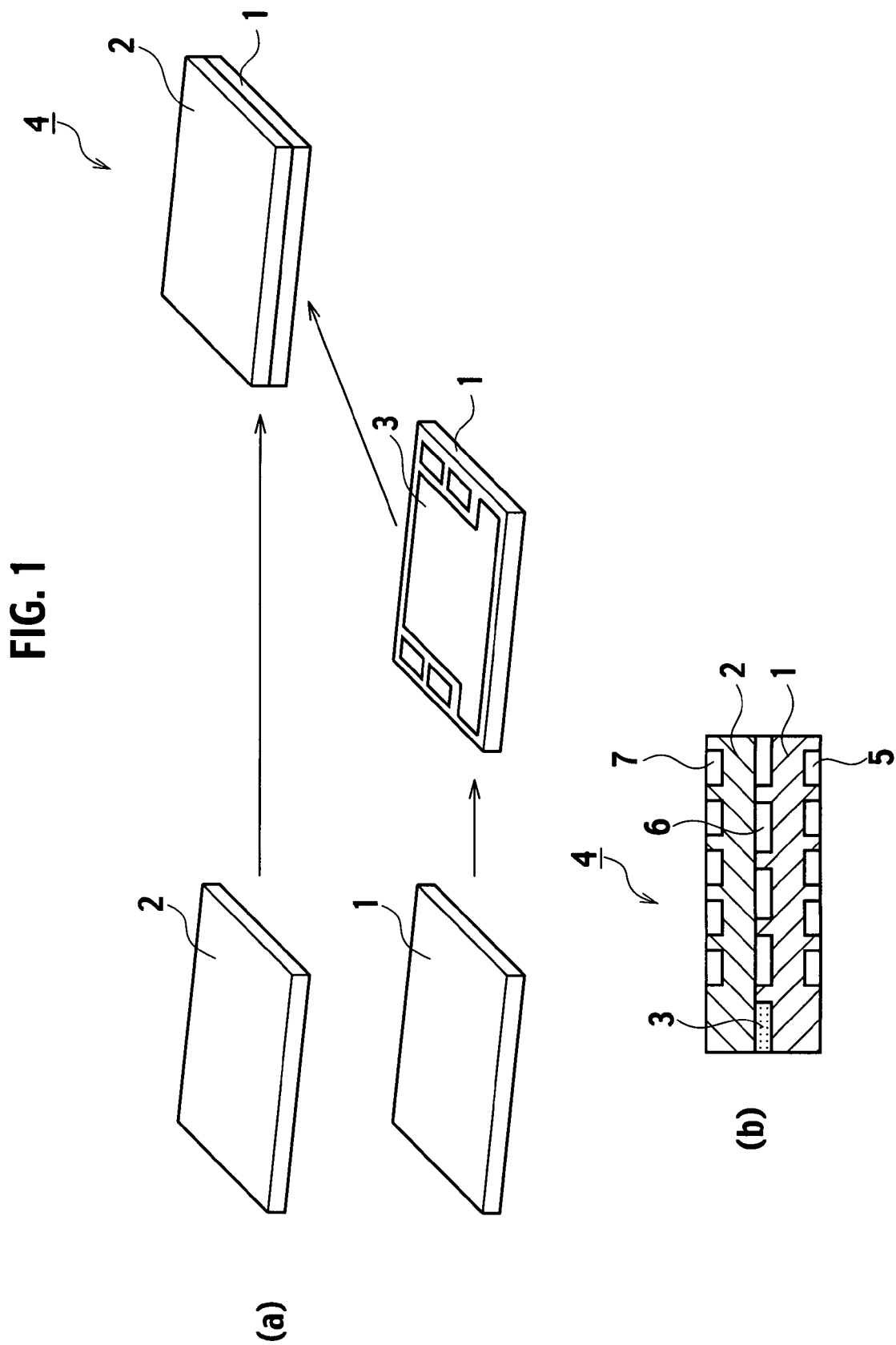
FIG. 1($a$) is a view showing main steps of an adhesion method of separators according to a first embodiment of the present invention, and FIG. 1($b$) is a cross-sectional view of a separator unit obtained in the steps of FIG. 1($a$).

FIG. 1($a$) is a flowchart showing main steps of the adhesion method of separators according to the first embodiment.

In the adhesion method of separators according to the first embodiment, on a surface (an upper surface in the drawing) of a first separator 1, on which an adhesive 3 is coated, a second separator 2 that has a reverse polarity (that is, in which a polarity is reverse) to a polarity of the first separator 1 is stacked, and a separator unit 4 as a set is obtained. Then, at least two or more sets of the separator units 4 are stacked on one another, and the adhesive 3 is cured.

Specifically, as shown in FIG. 1($a$), first, the first separator (a negative electrode separator in this case) 1 and the second separator (a positive electrode separator) 2 are prepared. As shown in FIG. 1($b$), in the first separator 1, on a lower surface thereof facing to a negative electrode of a corresponding single cell, a negative electrode (oxidizer electrode) passage 5 is formed, and on an upper surface thereof, a cooling medium passage 6 is formed. In the second separator 2, on an upper surface thereof facing to a positive electrode of a corresponding single cell, a positive electrode (fuel electrode) passage 7 is formed, and on a lower surface thereof, a cooling medium passage is formed according to needs. However, a region of the lower surface shown in FIG. 1($b$) becomes flat as a wall surface that defines the cooling medium passage 6 on the upper surface of the first separator from the above.

Next, the adhesive 3 is coated on the upper surface of the first separator 1. As shown in the center of FIG. 1($a$), in each of the separators, on left and right edge portions thereof, main supply lines or main return lines of the respective utilities (fuel, an oxidizer, and a cooling medium) are formed. On the upper and lower surfaces of each separator, which exclude the edge portions, distributing/collecting passage networks which communicate with the main supply and return lines of the corresponding utilities (the cooling medium on the upper surface of the first separator in the case of FIG. 1) are formed. As a rule, the adhesive 3 is coated on the entire region of the upper surface of the first separator 1, which contacts the lower surface of the second separator 2. In this point, the adhesive 3 not only becomes an adhering bonding material of the separators 1 and 2, but also serves as a sealing material between the respective main utility lines and the passage networks and between these lines and networks and the outside of the stack, and the adhesive 3 is coated continuously also on regions required for such sealing. FIG. 1(b) illustrates a region where the adhesive 3 is coated on a recessed surface portion; however, the region on which the adhesive 3 is coated may be present not only on a flat surface portion but also on a protruded surface portion.

The adhesive 3 is coated not only on the entire upper surface of the first separator 1, which contacts the lower surface of the second separator 2, but also on the entire lower surface of the second separator 2, which contacts the upper surface of the first separator 1.

Next, the second separator 2 is mounted on the first separator 1 in a manner of accurately superimposing the lower surface of the second separator 2 on the upper surface of the first separator, on which the adhesive 3 is coated, whereby the separator unit 4 composed of a set (a pair in this case) of the separators is obtained. In the unit 4 in this state, the adhesive 3 is not still cured.

Accordingly, two or more of the separator units 4 in a state where the adhesive 3 is not cured are stacked on one another, and the adhesive unit 3 in these units 4 is cured simultaneously in an appropriate manner (for example, by being changed with time while a temperature is being adjusted and a pressure is being applied to the units), whereby the adhesion and bonding of the separators 1 and 2 which compose the entire stacked units 4 are completed by a single operation.

The first and second separators 1 and 2 made of a molded material tend to be locally contracted and deformed when the adhesive 3 is cured, and tend to have a residual stress in such contracted and deformed regions. In order to suppress the residual stress, the adhesive 3 is cured at a low temperature, and hence, it takes a long time to cure the adhesive 3. When the adhesive 3 is of silicon, it takes several ten hours to cure the adhesive concerned depending on a type thereof. Accordingly, in the case of manufacturing a fuel cell stack by stacking unit cells on one another, it is frequent that a curing time of the adhesive 3 per unit cell governs a manufacturing period of the stack.

According to the above-described embodiment, the plural sets (that is, two sets or more) of separator units 4 are stacked on one another, and the adhesive 3 is then cured, whereby the adhesive 3 of these units 4 can be cured simultaneously, and manufacturing efficiency is increased.

In order to stack the plural sets of separator units 4 on one another and then to cure the adhesive 3, it becomes necessary to manage and control pressurization conditions for the respective units 4, and specifically, an average surface pressure (that is, a pressure per unit area) applied to the adhesive 3.

The surface pressure applied to the adhesive 3 is managed on the assumption that a coating area thereof is equal to a contact area between the upper surface of each separator 1 and the lower surface of each separator 2, and that a local displacement does not occur in the separators when the adhesive is cured.

Hence, the above-described surface pressure is equal to a pressure obtained by dividing a total pressure (specifically, a total pressure applied to the separators 2) received by the separator units 4 by the contact area between the separators 1 and 2. For managing the surface pressure, the above-described total pressure just needs to be grasped since the above-described contact area is known from the manufacturing specifications. The total pressure can be calculated by adding a load based on weights of the intermediate units 4 and a load (for example, an increased load or a decreased load owing to a vertical component of side surface retention force) for restraining the intermediate units 4 to a pressing load applied to the separator 2 in the upper side of the uppermost unit 4. The surface pressure can be controlled by adjusting such loads (in particular, a pressing load and a decreased load).

It is preferable that the surface pressure when the adhesive 3 is cured be equal to or more than a surface pressure corresponding to a stack load of the fuel cell stack. Specifically, the stack load is a load received by the respective separators 1 and 2 or the units 4 by final tightening of tie rods which connect end plates to each other when the separator units 4 in which the adhesion of the plurality of single cells is completed are sequentially stacked on one another to assemble the fuel cell stack.

In this point, several ten to several hundred separators are used in the fuel cell stack, and even if manufacturing dimensions of the respective separators meet a predetermined tolerance, there is an apprehension that a thickness of these stacked separators may go out of specification conditions. Moreover, when the separators 1 and 2 are adhered on each other by the surfaces including the cooling medium 6, the adhered regions or adhesion conditions thereof sometimes differ among the units, and manufacturing management of the fuel cell stack becomes complicated. Also in this point, even if the thickness of each separator unit 4 can be managed well, it is difficult to successfully manage the total thickness occupied by the separator units 4 in the stacked thickness of the fuel cell stacks.

Accordingly, the surface pressure when the adhesive 3 is cured is set at the surface pressure (approximately 0.2 MPa to 2 PMa) applied when the fuel cell stacks are stacked on one another or more. In such a way, at the same time when the adhesion of the respective separators 1 and 2 is completed, a dimensional measurement/adjustment of the stacked thickness of the separator units in the fuel cell stacks is done. The set pressure can be increased according to needs, and the respective dimensions can also be corrected.

A curing temperature of the adhesive 3 is set at a molding temperature of the respective separators 1 and 2 or more. Specifically, the curing temperature is an average temperature of the adhesive 3 at the time of being cured, and is managed as an average temperature of the separators 1 and 2 which sandwich the adhesive 3 therebetween.

A carbon separator contains a component of resin, and the component obtains fluidity at such separator molding temperature or more. Hence, if the separators 1 and 2 are made of the carbon separators so as to be somewhat thicker than the thickness of the specifications (to have a positive tolerance), and the adhesive 3 is cured at a molding temperature thereof or more, then the thickness of the separator units 4 can be adjusted simultaneously when the separators 1 and 2 are adhered and bonded to each other. Hence, manufacturing errors of the separators 1 and 2 can be absorbed as appropriate.

Figure 2:
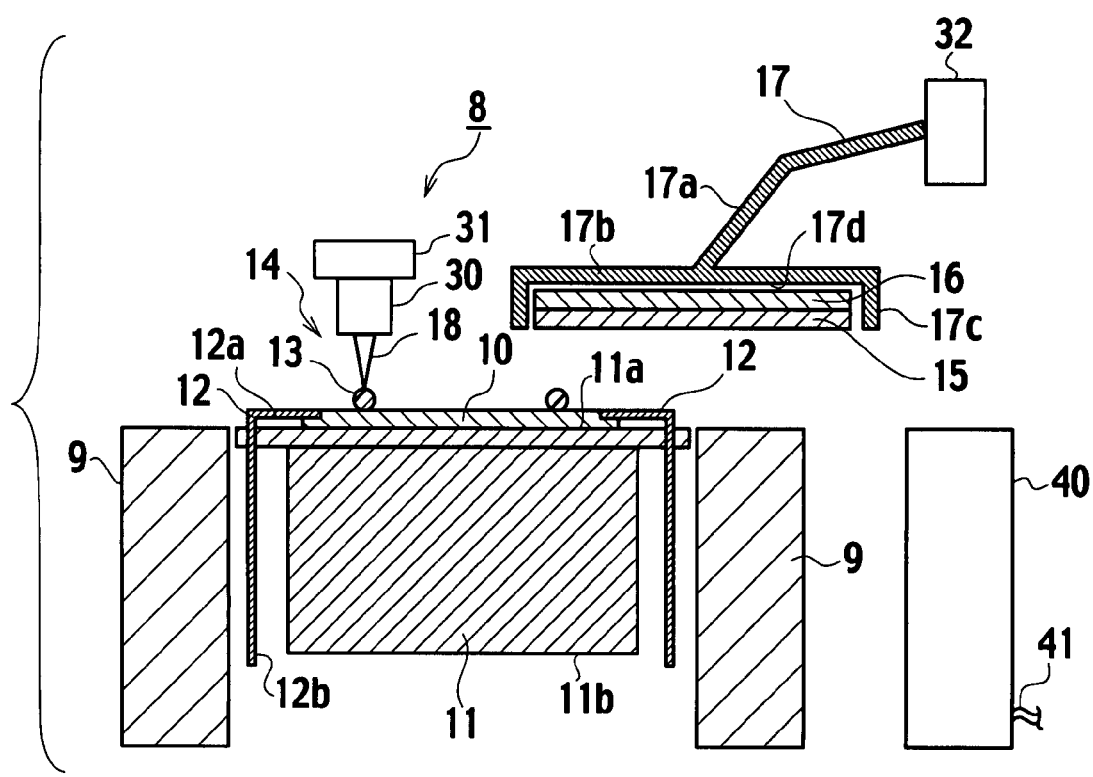
FIG. 2 is a cross-sectional view of an adhesion apparatus of the separators, which executes the adhesion method of separators according to the first embodiment.

Next, a description will be made of an adhesion apparatus 8 of separators, which executes the above-described adhesion method of separators, with reference to FIG. 2. FIG. 2 is a side cross-sectional view of the adhesion apparatus 8.

The adhesion apparatus 8 includes front and rear outer frames 9 and 9 which compose main portions of a machine casing centered with respect to a concrete foundation (not shown), a stage 11 as a separator receiving portion that is vertically movable along stopper-equipped guides (not shown) provided on the outer frames 9 and 9, a conveyor portion 17 that conveys separators (for example, separators 15 and 16 of FIG. 2) to the stage 11, front and rear fixing portions 12 and 12 which hold and fix, on the stage 11, a separator (for example, a separator 10 of FIG. 2) mounted and stacked on the stage 11 by the conveyor portion 17, and an adhesive coating portion 14 capable of continuously coating the adhesive on the separator held and fixed on the stage 11 by the fixing portions 12 and 12. The adhesion apparatus 8 is further includes an operation panel 40 capable of operating the stage 11, the conveyor portion 17, the fixing portions 12, and the adhesive coating portion 14 in the respective modes which are manual and automatic.

The stage 11 as a handling portion for handling the separator unit is composed of a table 11a in which front and rear edge portions are engaged with the guides of the outer frames 9 and 9, and of a drive portion 11b fixed to a lower surface of the table 11a. The table 11a includes, on an upper surface thereof, a holding portion (not shown) that houses and holds a part of the lowermost separator (or a current collector or a fixing jig), and the drive portion 11b has a Z-axis motor (not shown) that moves the drive portion 11b itself up and down together with the table 11a.

The conveyor portion 17 includes a holding portion 17b that horizontally stacks, houses and holds the separators (the separators 15 and 16 of FIG. 2) composing the separator unit as a set, a support portion 17a that supports the holding portion 17b from obliquely above, and a feed portion 32 having a set (not shown) of X-axis, Y-axis and Z-axis motors which feed the support portion 17a to an arbitrary three-dimensional direction. The holding portion 17b includes a claw (refer to FIG. 7) with a substantial L shape when viewed from aside, which becomes a stopper or a hook that engages and holds the lowermost separator (the separator 15 of FIG. 2) from a side surface thereof or a lower surface thereof. The claw operates in accordance with a control signal sent through the support portion 17a.

Each of the fixing portions 12 has a substantially C-shaped or I-shaped engagement portion 12a in which an inner edge or a tip end is engaged from sideward with an outer circumference or side edge portions (front and rear edge portions in FIG. 2) of the designated separator, for example, the uppermost or intermediate separator (or the current collector or the fixing jig), and has an engagement portion 12b that is extended downward from an outer edge or base end of the engagement portion 12a, freely fitted to a guide hole of the table 11a to face toward the front or rear of the drive portion 11b, and has a lower end engaged with a combination of a fore-and-aft feed mechanism (not shown) and a vertical feed mechanism (not shown), which are provided on a corresponding side surface of the outer frame 9 or 9.

Note that there are many types of the separators, and structures thereof are various. There is also a separator in which passage openings or access holes are provided in side surfaces. The separator may be fixed to the stage 11 by inserting tip ends of the engagement portions 12 into the openings or the access holes, which are described above. In this case, clearances are not required for the engagement portion 12a in the event of applying a load to the separator from above, and the entire upper surface of the separator can be used effectively.

The adhesive coating portion 14 as an adhesive curing portion includes a plurality of adhesive coating rollers 13 which roll on the upper surface of the separator (the separator 10 of FIG. 2) fixed to the stage 11 and coat the adhesive on contact regions thereof with the upper surface, one row of adhesive nozzles 18 capable of continuously attaching the adhesive onto the rollers 13 from above, an adhesive dispenser 30 that supplies the adhesive to the nozzles 18, and a moving portion 31 having a set (not shown) of X-axis, Y-axis and Z-axis motors which move the dispenser 30 in an arbitrary three-dimensional direction. The moving portion 31 moves a holding frame of the rollers 13 together with the dispenser 30 to a rest position apart from the separator after the adhesive is coated.

The adhesive may be coated not by means of the rollers 13 but by other methods such as a screen printing method.

For example, a method may be used, in which the adhesive rounded to a shape of the rollers 13 is supplied from the nozzles 18 onto the negative electrode separator, the adhesive is crushed by applying a load thereto, and the adhesive is then spread. In this case, reference numeral 13 in the drawing will denote the adhesive.

A control signal line 41 of the operation panel 40 is connected to the respective movable portions of the apparatus 8.

The adhesion apparatus 8 can correct deflections of the respective separators. Even after coating the adhesive on the uppermost separator, stacking the next separator thereon, and setting the separators into a state of the unit, the adhesion apparatus 8 can further stack the next separator on the unit and can coat the adhesive on the stacked separator while holding the state of the unit as it is and preventing a recurrence of the deflection. Hence, the adhesion apparatus 8 can sequentially stack plural sets of the separator units in a state where the adhesive is coated thereon, can simultaneously cure the adhesive on the respective units, and can efficiently measure and adjust thicknesses of the respective separator units and the total thickness thereof.

Next, a description will be specifically made of an adhesion method of separators, which uses the adhesion apparatus 8, with reference to FIG. 3 to FIG. 6. Reference numerals 19 to 26 are assigned to the following separators in order to avoid confusion.

Figure 3:
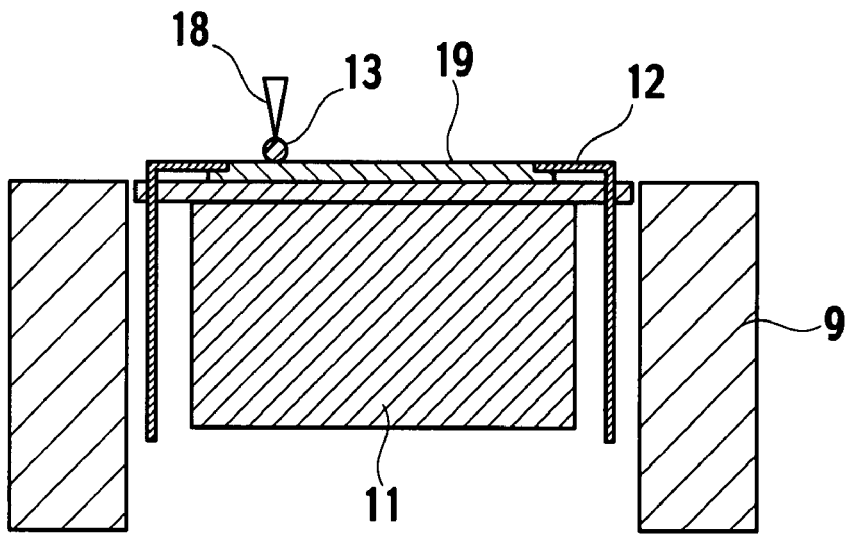
FIG. 3 is a cross-sectional view of the adhesion apparatus, showing the first step of the adhesion method of separators according to the first embodiment.

First, as shown in FIG. 3, the negative electrode separator 19 of the separator unit that currently becomes an adhesion target is mounted on and fixed to the stage 11 by hand or the conveyor unit 17, and the adhesive is flown to the outer circumferences of the rollers 13 from the nozzles 18. The adhesive is appropriately selected, for example, from a silicon one or an epoxy one in response to a material and curing temperature of the separator 19.

Figure 4:
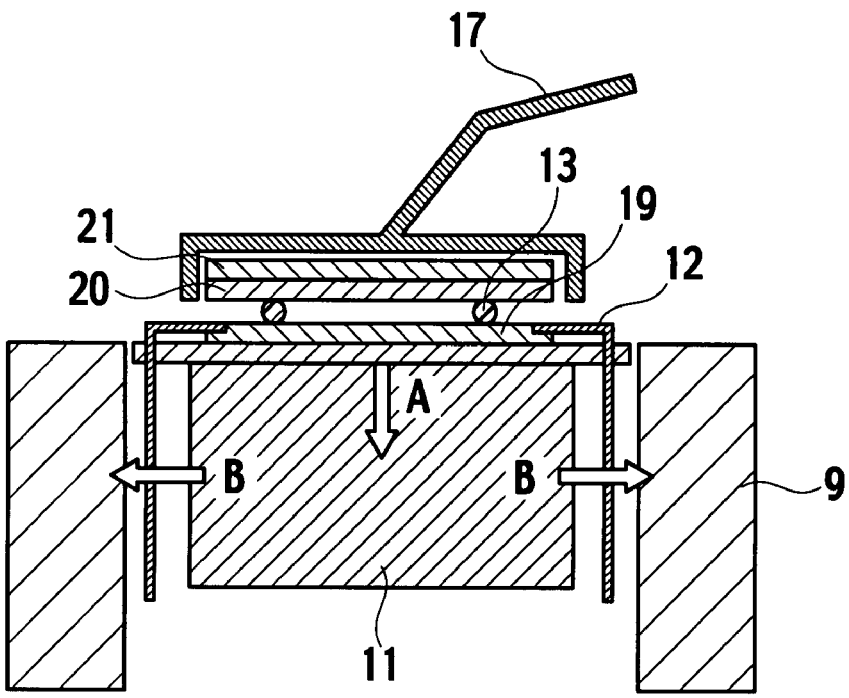
FIG. 4 is a cross-sectional view of the adhesion apparatus, showing the second step of the adhesion method of separators according to the first embodiment.

Next, as shown in FIG. 4, the positive electrode separator 20 of the separator unit that currently becomes the adhesion target and the negative electrode separator 21 of the separator unit that becomes the adhesion target at the next time are held in a stacked manner, and conveyed onto the stage 11 by the conveyor portion 17. Then, the conveyor portion 17 is moved down to bring the lower surface of the separator 20 in contact with the rollers 13. Then, the stage 11 or the conveyor portion 17 is moved forward and rearward, or the rollers 13 are rotated, and the adhesive is coated on the upper surface of the separator 19 and the lower surface of the separator 20.

Next, a position of the stage 11 is shifted in an A direction, whereby the rollers 13 are moved to the rest position, and the fixing portions 12 are slid outward (B direction) by the fore-and-aft feed mechanism, and are spaced apart from the separator 19.

Figure 5:
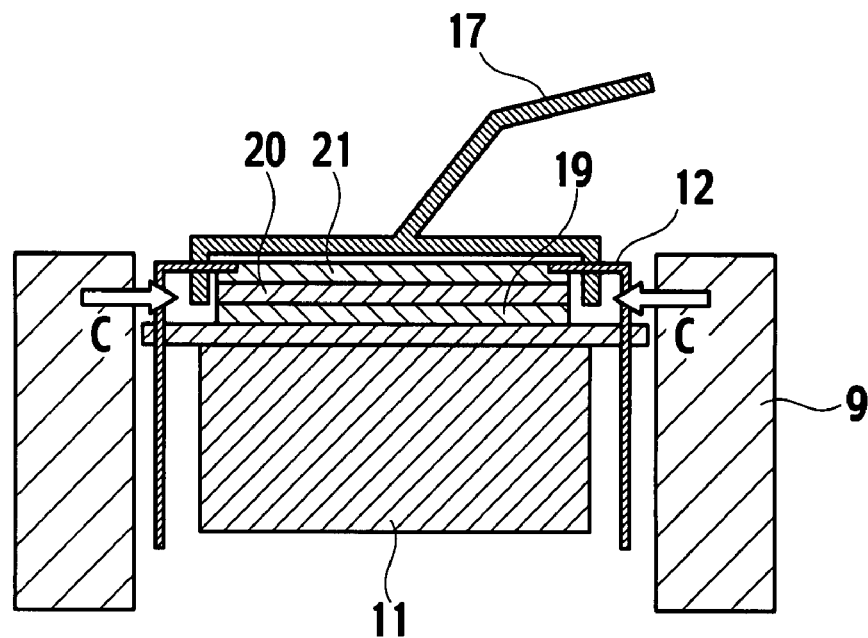
FIG. 5 is a cross-sectional view of the adhesion apparatus, showing the third step of the adhesion method of separators according to the first embodiment.

Next, as shown in FIG. 5, after the stage 11 is moved down by the thickness of the separators 20 and 21, the conveyor portion 17 is lowered, a stack of the separators 20 and 21 is mounted on the separator 19, the fixing portions 12 are slid inward (C direction) and engaged with the separator 21. In such a way, the separators 19, 20 and 21 are set on the stage 11 in a state where the adhesive is uncured.

Figure 6:
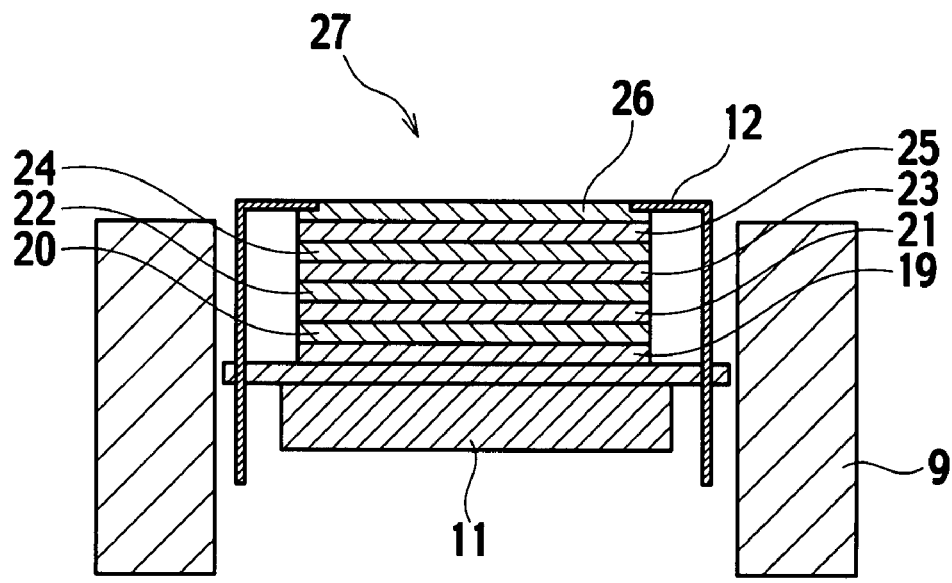
FIG. 6 is a cross-sectional view of the adhesion apparatus, showing the fourth step of the adhesion method of separators according to the first embodiment.

The above-described operations are repeated, and as shown in FIG. 6, a stack of the separators 22 and 23 and a stack of the separators 24 and 25 are set, and finally, the positive electrode separator 26 of the uppermost separator unit is set. In such a way, a stacked body 27 of the plural sets of separator units 19, 20 and 21, 22 and 23, 24 and 25, and 26 in the state where the adhesive is uncured is obtained. The stage 11 and/or the fixing portions 12 are moved up and down, dimensional measurement/adjustment and loading conditions are set, and further, temperature conditions are set, and then a curing treatment for the adhesive is started.

Figure 7:
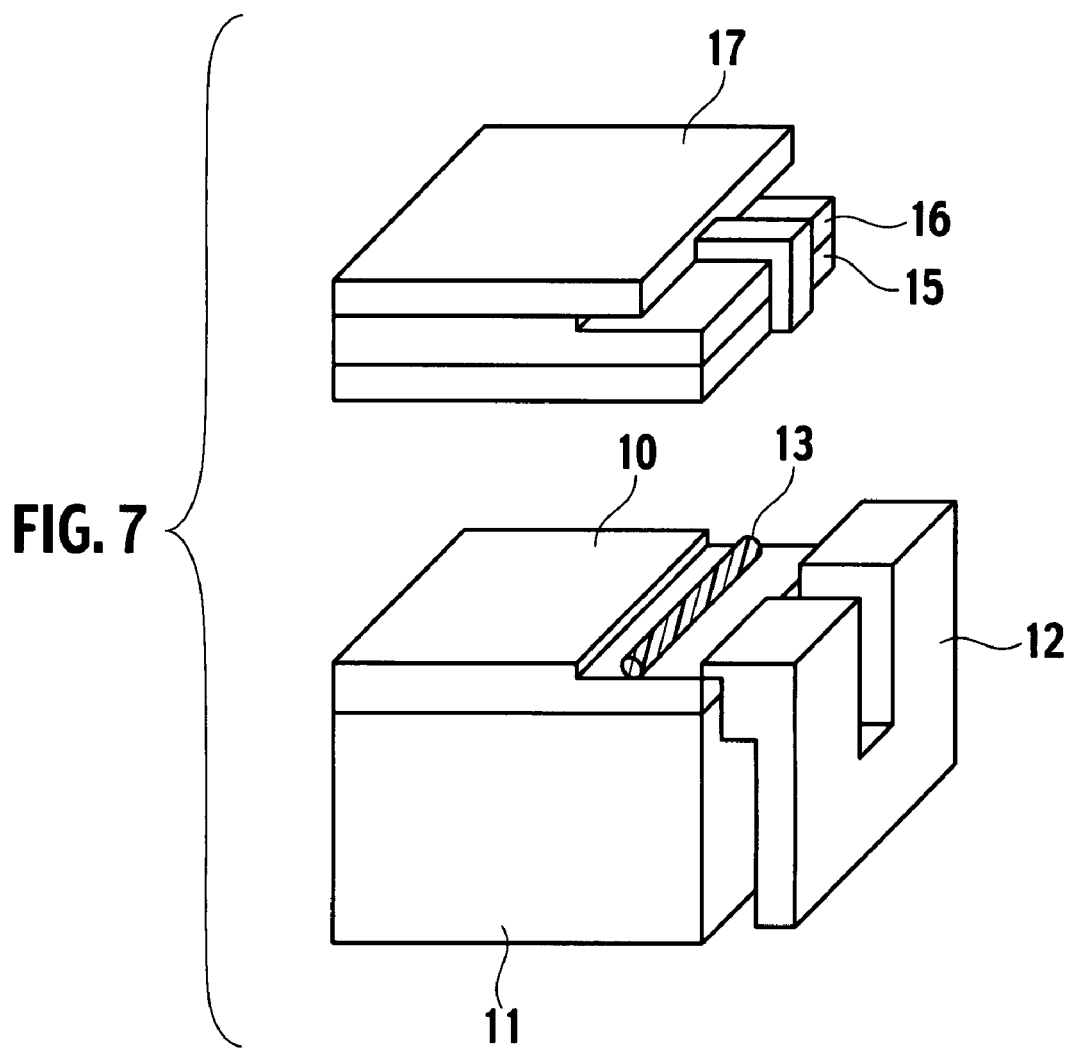
FIG. 7 is a main portion perspective view of the adhesion apparatus of FIG. 2.

Here, FIG. 7 shows positional relationships among main portions of the stage 11, fixing portions 12 and conveyor portion 17 of the adhesion apparatus 8 in FIG. 2 and the separators 10, 15 and 16.

As illustrated in FIG. 7, the positive separator 10 on which the adhesive is coated by the rollers 13 is set on the stage 11 by the fixing portions 12. The conveyor portion 17 holds the positive electrode separator 15, which is opposite to the separator 10, and the next negative electrode separator 16 in a stacking manner, and faces to the separator 10 on the stage 11 from above.

In order that the conveyor portion 17 cannot interfere with the fixing portions 12 even if approaching the fixing portions 12 in the case of setting the separators 15 and 16 conveyed by the conveyor portion 17 on the stage 11, in each of the fixing portions 12, in a fore-and-aft center portion of the engagement portion thereof, a groove is formed, which allows the claw of the conveyor portion 17 to perform the separator engagement/release operations.

Figure 8:
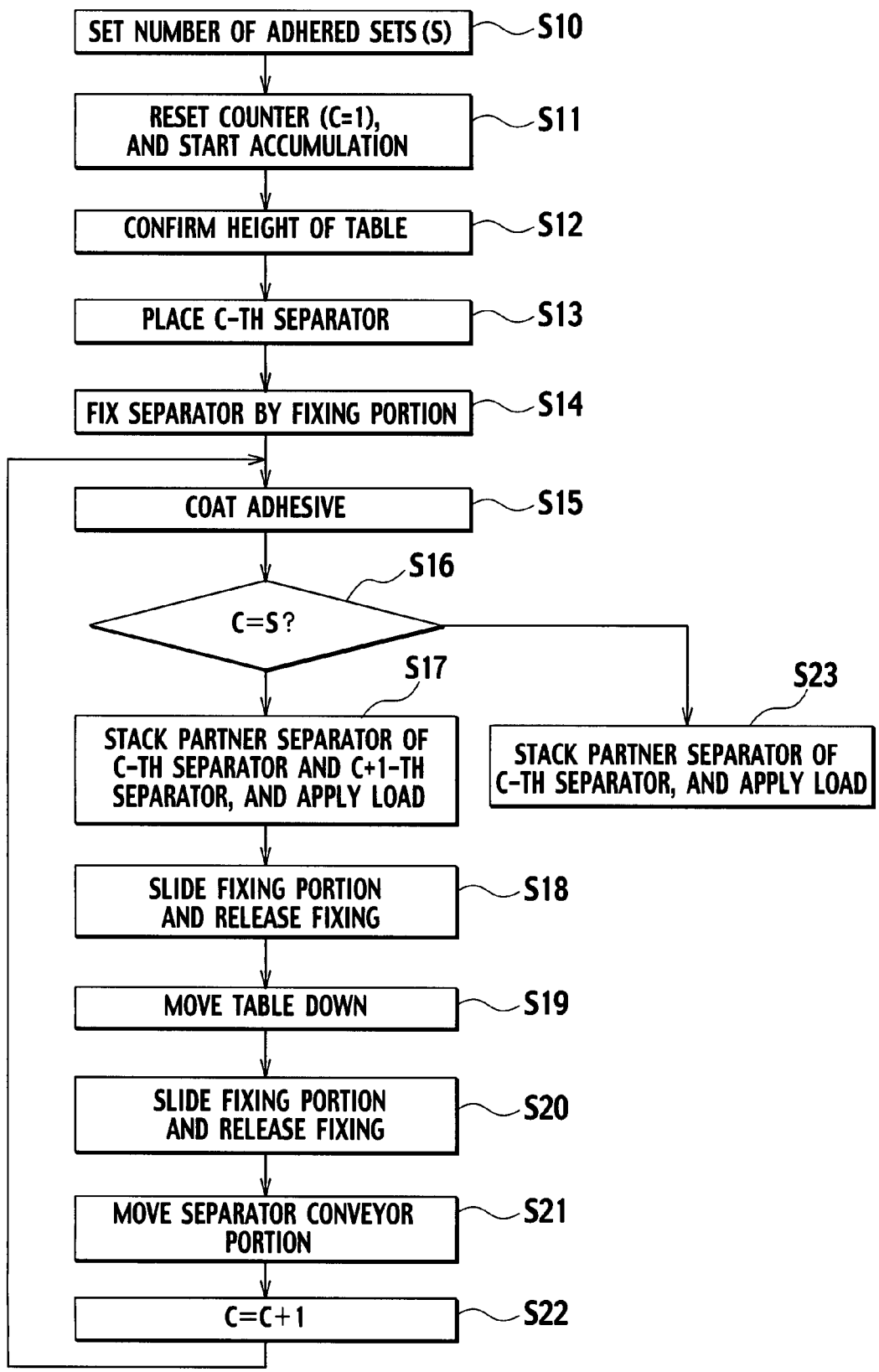
FIG. 8 is a flowchart showing control operations of the adhesion apparatus of FIG. 2.

Next, a description will be made of control operations by the operation panel 40 of the adhesion apparatus 8 with reference to FIG. 8. The operation panel 40 builds a central processing unit therein, and FIG. 8 is a flowchart of control operations executed thereby.

First, the number of sets S of the separator units which become the adhesion target is set (Step 10). The number of sets S is set appropriately in response to the thicknesses of the separators, the dimension of the curing jig, and the like.

Next, the operation of the conveyor portion 17 is started. A counted value C of a counter that accumulates the number of conveyed sets of the separator units when each set is about to be conveyed is reset (C=1) (Step 11).

Next, it is checked whether or not the upper surface of the table 11a is located in height at a position of a zero point. If the upper surface is not located in height at the zero point, the position is reset to the zero point (Step 12).

Next, between the positive electrode and negative electrode separators of the separator unit that becomes the conveying target for a C-th time, the earlier conveyed separator (that is, the negative electrode separator conveyed for the C-th time; hereinafter, referred to as a "C-th separator") is mounted on the table 11a (or on the uppermost separator on the table 11a if other separators are already placed thereon) (Step 13).

Next, the above-described C-th separator is fixed by the fixing portions 12 (Step 14).

Next, the adhesive is coated on the C-th separator (Step 15).

Next, it is determined whether or not the accumulated value C of the number of conveyed sets of the separator units has reached the number of sets S of the adhesion targets (C=S) (Step 16). Then, in the case of "No" (that is, C<S), the operations proceed to Step S17 in order to continue the conveyance of the unit as the adhesion target also in the next cycle. In the case of "Yes" (that is, C=S), the operations proceed to Step S23 in order to end the conveyance of the unit as the adhesion target in the current cycle.

In Step S17, between the positive electrode and negative electrode separators of the separator unit that becomes the conveying target for the C-th time, the later conveyed separator (that is, a positive electrode separator conveyed for a C+1-th time; hereinafter, referred to as a "partner separator of the C-th separator") and a C+1-th separator (that is, a negative electrode separator conveyed for the C+1-th time) are conveyed onto the stage 11 by the conveyor portion 17, are mounted on a partner separator of the C-1-th separator (that is, the uppermost separator among the separators placed on the table 11a), and the load is applied thereto when the reference numeral 13 denotes the adhesive. In the case of Step S23, the partner separator of the C-th separator is conveyed onto the stage 11 by the conveyor portion 17, is mounted on the partner separator of the C-1-th separator, and the load is applied thereto when the reference numeral 13 denotes the adhesive. Then, the operations proceed to the curing treatment for the adhesive.

After Step S17 described above, the fixing portions 12 are slid outward, the fixing of the partner separator of the C-1-th separator is released (Step 18), and the stage 11 is lowered to move down the table 11a (Step 19). Then, the fixing portions 12 are slid inward, and the C+1-th separator is fixed (Step 20). Subsequently, the conveyor portion 17 that has finished playing a role thereof as a carriage portion of the separators is moved to a standby position thereof (Step 21), and the counted value C of the number of conveyed sets is incremented as C=C+1 (Step 22). Then, the operations proceed to Step S15.

In accordance with the control method as described above, not only two separators can be conveyed simultaneously by the conveyor portion 17, but also the adhesive can be continuously coated on the separators, and the manufacturing time can be shortened.

When the reference numeral 13 denotes the adhesive, the separators can be fixed by the fixing portions 12 after applying the load to the separators, and the correction of the deflection of the separators and the prevention of the recurrence thereof can be suitably performed. In such a way, the separator adhesion body becomes stable. In addition, as shown in FIG. 4, the stack of the positive electrode separator and the negative electrode separator is mounted on the negative electrode separator on which the adhesive is coated, and then the load is applied thereto. Accordingly, the highly viscous adhesive can be surely crushed, and adhesiveness for the separators can be enhanced.

In accordance with this embodiment, even if the separators are formed of a thin fragile material, rigidity of the separators is enhanced by the adhesion, and handling easiness of the separators is enhanced.

Second Embodiment

This embodiment is one in which the adhesion apparatus of separators, which has been shown in the first embodiment, is improved, and a description will be made thereof based on FIG. 9 and FIG. 10. Note that the same reference numerals are used for the same regions as the regions of the configuration shown in FIG. 2. Reference numeral 13 denotes the adhesive.

The adhesion apparatus of separators according to this embodiment is configured not to move the stage 11 on which the separators are mounted but to make the fixing portions 12 movable in the vertical direction and the crosswise direction.

Figure 9:
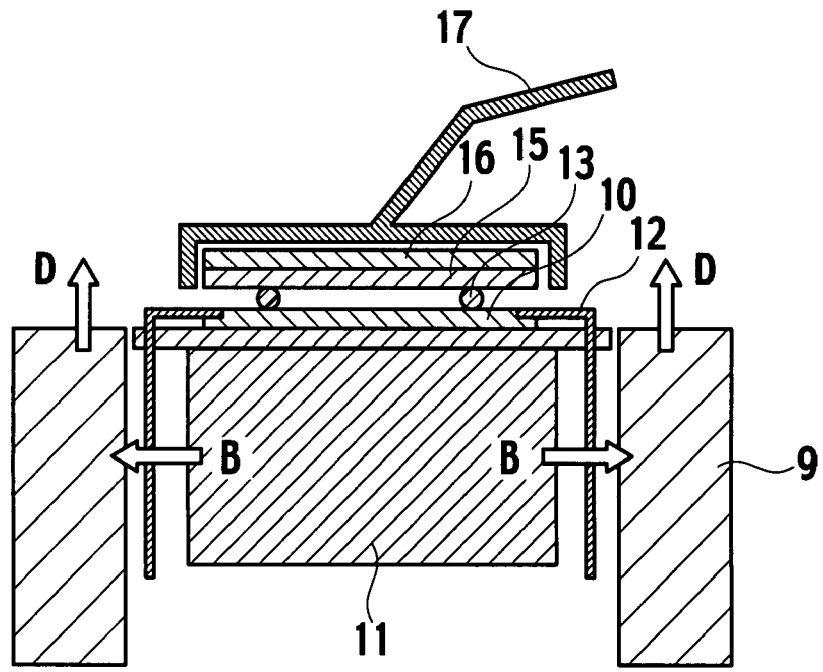
FIG. 9 is a cross-sectional view of an adhesion apparatus, showing a main step of an adhesion method of separators according to a second embodiment of the present invention.
Figure 10:
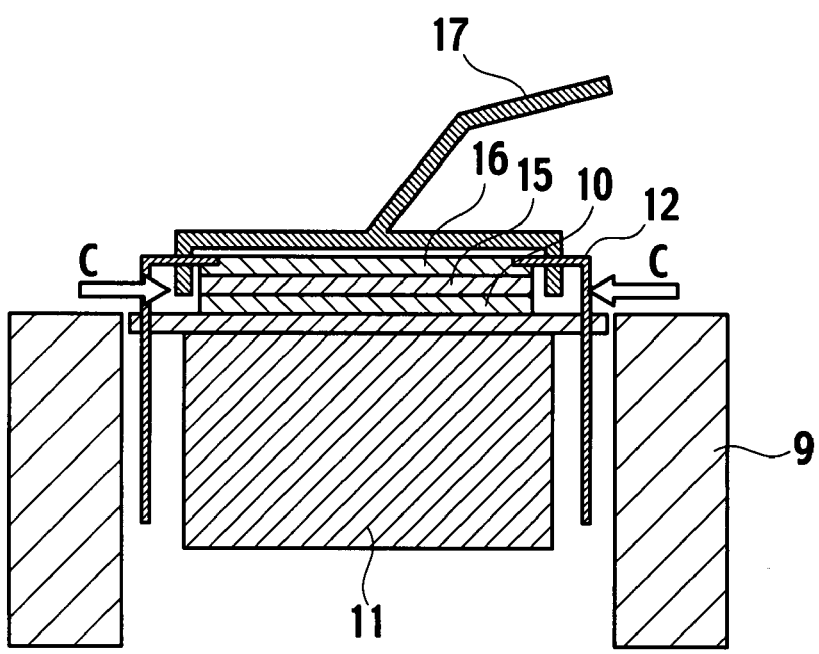
FIG. 10 is a cross-sectional view of the adhesion apparatus, showing another main step of the adhesion method of separators according to the second embodiment.

As shown in FIG. 9, after the separators 15 and 16 are conveyed onto the stage 11 by using the conveyor portion 17, the fixing portions 12 are slid outward (B direction) and drawn out from the separators, the fixing portions 12 are moved up in a D direction. Then, the load is applied to the separators one more time, and as shown in FIG. 10, the fixing portions 12 are slide inward (C direction) to thereby fix the separators. Accordingly, as shown in FIG. 10, as the separators are being adhered on one another, the position of the fixing portions 12 is moved up.

In accordance with this embodiment, the fixing portions are movable in the vertical and crosswise directions. Accordingly, even if the deflection occurs in the separators, the separators can be continuously adhered on one another while correcting the deflection.

This embodiment is one in which the adhesion apparatus of separators, which has been shown in the first embodiment, is improved, and a description will be made thereof based on FIG. 11 and FIG. 12. Reference numeral 13 denotes the adhesive.

In this embodiment, an adhesion apparatus of separators is used, in which a jig (fixing jig) for curing the adhesive is applied as the stage that fixes the separators.

Figure 11:
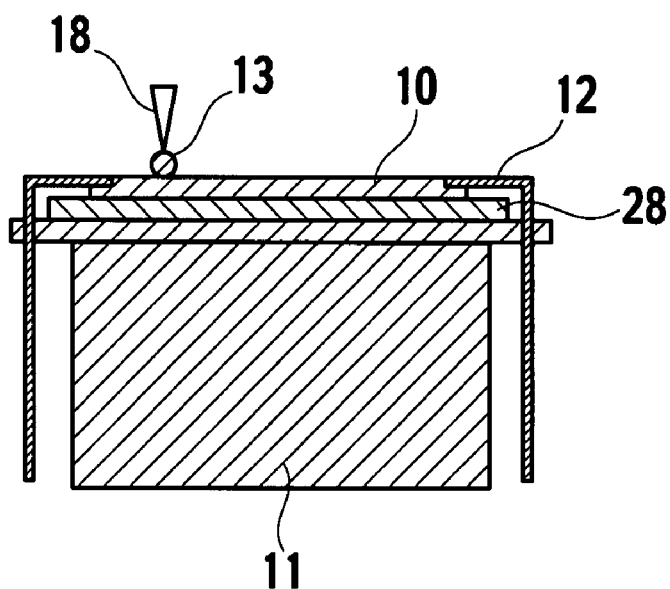
FIG. 11 is a cross-sectional view of an adhesion apparatus, showing a main step of an adhesion method of separators according to a third embodiment of the present invention.
Figure 12:
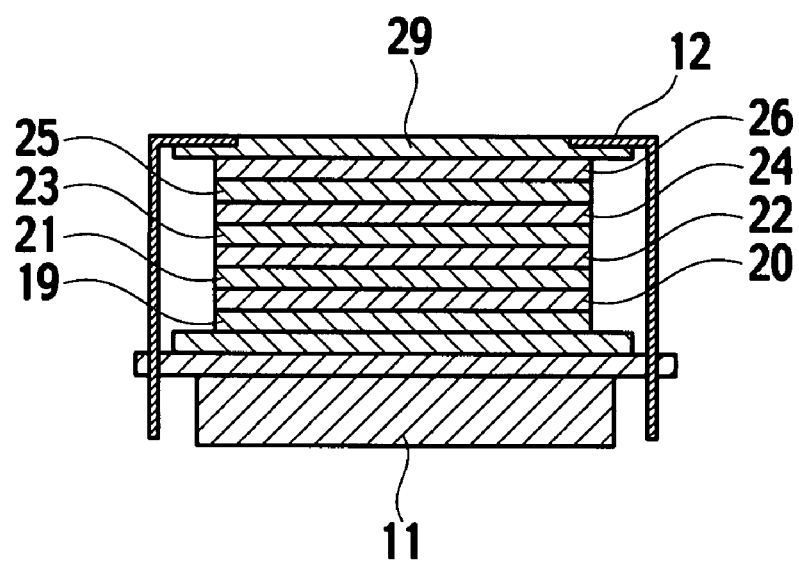
FIG. 12 is a cross-sectional view of the adhesion apparatus, showing another main step of the adhesion method of separators according to the third embodiment.

As shown in FIG. 11, the jig (fixing jig) 28 for curing the adhesive 13 is first conveyed onto the stage 11 by using the conveyor portion 17, and subsequently, the separators 19 and 20 are conveyed thereonto, and the separators 19 and 20 are adhered on each other. The respective steps of adhering and stacking the separators, 19, 20 and 21, 22 and 23, 24 and 25, and 26 are repeated, and after the separators reach a predetermined number, the adhesive 13 is finally cured after a jig (fixing jig) 29 for curing the adhesive is finally stacked on the obtained stack.

In the event of heating the separators 19 to 26 in order to cure the adhesive 13 after coating the adhesive 13 thereon, it is necessary to fix the separators 19 to 26 and to apply a predetermined surface pressure to the separators 19 to 26. In accordance with this embodiment, the jigs (fixing jigs) 28 and 29 which vertically sandwich the plurality of stacked separators 19 to 26 therebetween are mounted on the stage 11. Accordingly, the separators can be adhered on one another far more efficiently.

Moreover, in accordance with this embodiment, naturally, similar effects to those of the first embodiment can be obtained.

In accordance with the adhesion method of separators according to each of the above-described embodiments, the plurality of separators can be adhered on one another efficiently in a short time, the manufacturing time can be shortened, and the separators can be continuously adhered on one another while correcting the deflection. In such a way, a highly reliable fuel cell can also be obtained.

In accordance with the adhesion apparatus of separators according to each of the above-described embodiments, the deflection is reduced, thus making it possible to adhere the separators on one another with high dimensional accuracy.

Hence, in accordance with the above-described embodiments, an adhesion body of the separators with a less deflection and high dimensional accuracy is provided.

This application claims the priority based on Japanese Patent Application No. 2004-333389 filed to Japan Patent Office on Nov. 17, 2004, refers to the filed application, and incorporates contents of the file application therein.

Note that each of the above-described embodiments merely shows examples of the adhesion method and adhesion apparatus of separators according to the present invention, and the present invention is not limited to the illustrated embodiments. It will be understood by those skilled in the art that it is possible to embody the present invention in various modes without departing from the gist of the present invention, that is, the scope of claims.

INDUSTRIAL APPLICABILITY

In accordance with the present invention, there are provided the adhesion method of separators, which is capable of adhering the plurality of the separators on one another efficiently in a short time, the adhesion method of the separators, which is capable of shortening the manufacturing time, continuously adhering the separators on one another while correcting the deflection thereof, and obtaining the highly reliable fuel cell, the adhesion apparatus of the separators, which is capable of reducing the deflection, and adhering the separators on one another with the high dimensional accuracy, and the adhesion body of the separators with the less deflection and the high dimensional accuracy.

The invention claimed is:

1. An adhesion method of separators, comprising the steps of:
   molding a first separator and a second separator by compressing a mixture of carbon and thermosetting resin at a molding temperature,
   stacking the second separator, which becomes an opposite separator, to the first separator on a surface of the first separator, on which an adhesive is coated, thereby obtaining a separator unit as a set; and
   stacking two or more of the separator units on one another, and curing the adhesive;
   wherein a curing temperature when the adhesive is cured is equal to or more than the molding temperature of the separators,
   wherein the adhesive is selected as a low temperature thermosetting adhesive in response to a material and curing temperature of the separators,
   wherein a surface pressure at which the adhesive is cured is equal to or more than a surface pressure applied when separator units, which are prepared and uncured, are stacked on one another for a dimensional measurement/adjustment of a stacked thickness of the separator units.

2. An adhesion method of separators, comprising the steps of:
   molding a first separator and a second separator by compressing a mixture of carbon and thermosetting resin at a molding temperature,
   stacking the second separator, which becomes an opposite separator, to the first separator on a surface of the first separator, on which an adhesive is coated, thereby obtaining a separator unit as a set; and
   stacking two or more of the separator units on one another, and curing the adhesive,
   wherein a curing temperature when the adhesive is cured is equal to or more than the molding temperature of the separators,
   wherein the curing temperature is a temperature at which a silicon or an epoxy adhesive is cured,
   wherein a surface pressure at which the adhesive is cured is equal to or more than a surface pressure applied when separator units, which are prepared and uncured, are stacked on one another for a dimensional measurement/adjustment of a stacked thickness of the separator units.

3. An adhesion method of separators, comprising the following:
wherein there is used an adhesion apparatus of the separators, which includes a stage that mounts a separator thereon, an adhesive coating portion that coats an adhesive on the separator, a vertically and crosswise movable fixing portion that fixes the separator to the stage, and a conveyor portion that conveys the separator onto the stage, and after conveying a first separator onto the stage and fixing the first separator thereto, the adhesive is coated on the first separator, a separator unit, which includes a second separator and a third separator is conveyed onto the stage by using the conveyor portion and is stacked on a surface of the first separator so that the third separator of the separator unit can serve as a next first separator for a subsequent separator unit stacked with the separator unit, wherein each subsequent separator unit is conveyed onto the stage by using the conveyor portion, and subsequently the stage or the fixing portion is moved, wherein, while a subsequent separator unit is stacked on already stacked separators coated with adhesive, the already stacked separators are held to substantially prevent deflection of the already stacked separators, wherein a surface pressure at which the adhesive is cured is equal to or more than a surface pressure applied when the separator units, which are prepared and uncured, are stacked on one another for a dimensional measurement/adjustment of a stacked thickness of the separator units.

4. The adhesion method of separators according to claim 3, wherein, after conveying the separator unit onto the first separator, a load is applied to the respective separators.

5. The adhesion method of separators according to claim 4, wherein, after applying the load to the respective separators, the respective separators are fixed by the fixing portion.

6. The adhesion method of separators according to claim 3, wherein, after disposing a fixing jig on the stage, a plurality of separators are stacked on the fixing jig, and another fixing jig is disposed on an uppermost surface of the stacked separators.

7. The adhesion method of separators according to claim 3, wherein the fixing portion fixes side surfaces of the separators.

8. The adhesion method of separators according to claim 3, wherein the fixing portion presses the stacked separators to substantially prevent deflection of the stacked separators.

* * * * *